United States Patent
Liao (10) Patent No.: US 7,276,003 B2
(45) Date of Patent: Oct. 2, 2007

(54) VERTICAL BAND SAW MACHINE WITH A SPEED RATIO VARYING DEVICE

(76) Inventor: Juei-Seng Liao, No. 396, Yung-Ming St., Ta-Li City, Taichung Hsien (TW)

( * ) Notice: Subject to any disclaimer, the term of this patent is extended or adjusted under 35 U.S.C. 154(b) by 590 days.

(21) Appl. No.: 10/940,156

(22) Filed: Sep. 14, 2004

(65) Prior Publication Data
US 2005/0255947 A1    Nov. 17, 2005

(30) Foreign Application Priority Data
May 11, 2004   (TW) ............................. 93207281 U (51) Int. Cl.
F16H 55/56 (2006.01)
F16H 9/18 (2006.01)
B23D 55/00 (2006.01)
B23D 55/10 (2006.01)

(52) U.S. Cl. .............................. 474/8; 474/39; 474/40; 83/801; 83/785; 83/814

(58) Field of Classification Search .................. 474/8, 474/12, 26, 32, 39–40, 17; 83/785–788, 83/796, 812, 801–803, 814–819
See application file for complete search history.

(56) References Cited

U.S. PATENT DOCUMENTS

| | | | | |
|---|---|---|---|---|
| 1,449,015 A | * | 3/1923 | Schenkel | 83/804 |
| 1,879,145 A | * | 9/1932 | Bernard | 83/818 |
| 3,811,331 A | * | 5/1974 | Moogk | 474/19 |
| 4,356,750 A | * | 11/1982 | Legler et al. | 83/816 |
| 4,413,414 A | * | 11/1983 | Strzalka | 30/380 |
| 4,557,171 A | * | 12/1985 | Stolzer | 83/796 |
| 4,568,030 A | * | 2/1986 | Weichel | 241/101.2 |
| 4,605,386 A | * | 8/1986 | Harris | 474/8 |
| 4,624,167 A | * | 11/1986 | Stefanic | 83/802 |
| 4,658,689 A | * | 4/1987 | Yakich | 83/801 |
| 5,203,247 A | * | 4/1993 | D'Arcy | 83/794 |
| 5,341,712 A | * | 8/1994 | D'Arcy | 83/808 |
| 7,210,387 B2 | * | 5/2007 | Liao | 83/816 |

* cited by examiner

Primary Examiner—Marcus Charles
(74) Attorney, Agent, or Firm—Ostrolenk, Faber, Gerb & Soffen, LLP (57) ABSTRACT

A vertical band saw machine includes a first transmitting shaft driven by a drive force of a motor, a second transmitting shaft journaling a lower blade mounting pulley for rotating an endless band saw blade, and a speed ratio varying device coupling the transmitting shafts. The device includes two pitch-variable first and second pulleys mounted on the transmitting shafts, a belt trained on the pulleys, and a control unit operable to move a movable disc of the second pulley toward or away from a fixed disc of the second pulley so as to vary the radial distance between the belt and each of the transmitting shafts, thereby freely varying the speed ratio of the second transmitting shaft to the first transmitting shaft so as to rotate the saw blade at a desired speed.

5 Claims, 10 Drawing Sheets

VERTICAL BAND SAW MACHINE WITH A SPEED RATIO VARYING DEVICE

CROSS-REFERENCE TO RELATED APPLICATION

This application claims priority of Taiwanese Application No. 093207281, filed on May 11, 2004.

BACKGROUND OF THE INVENTION

1. Field of the Invention

This invention relates to a vertical band saw machine, more particularly to a vertical band saw machine with a speed ratio varying device for a transmitting shaft which is driven by a motor so as to effect rotational movement of an endless band saw blade.

2. Description of the Related Art

Figure 1:
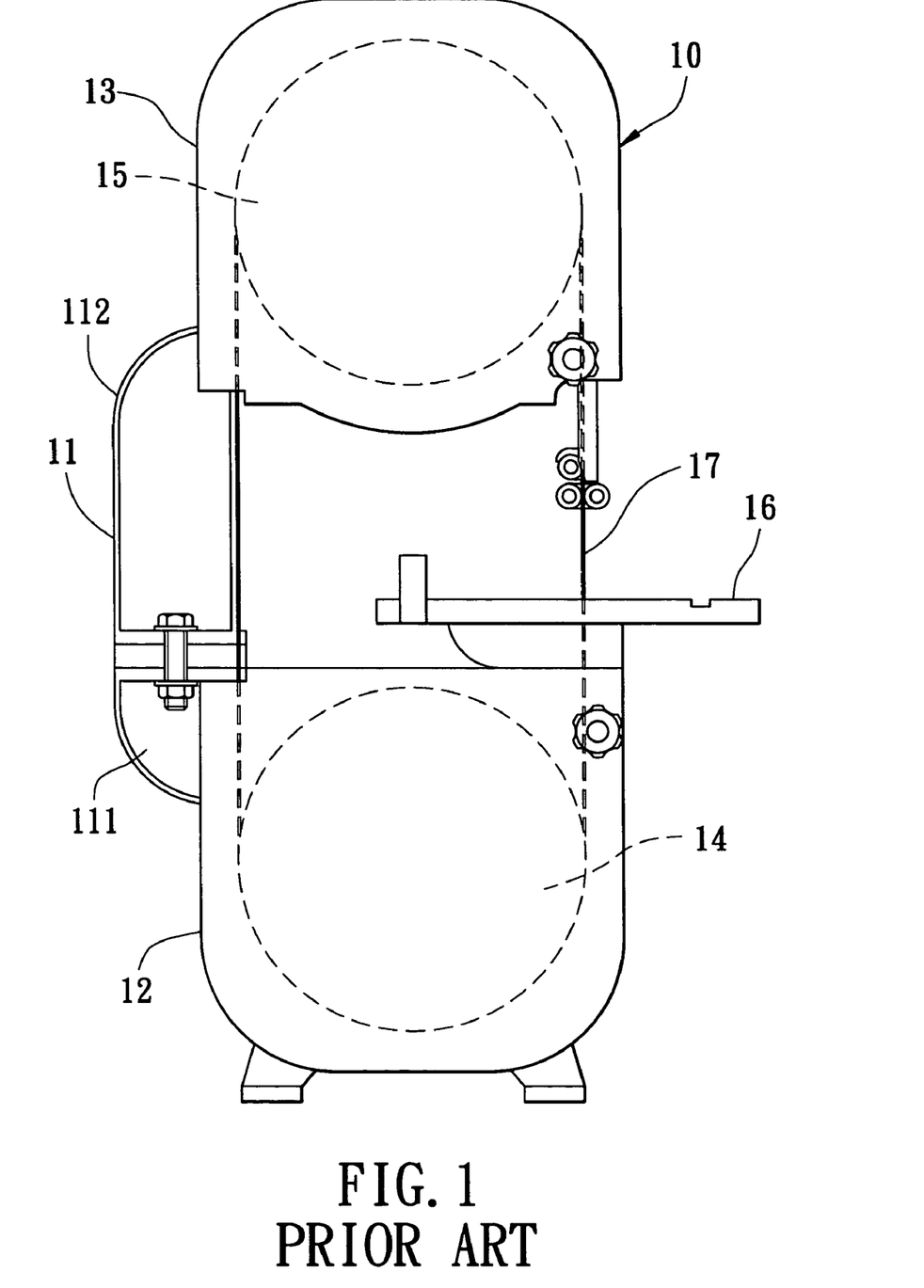
FIG. 1 is a schematic view of a conventional vertical band saw machine.

Referring to FIG. 1, a conventional vertical band saw machine 10 is shown to include a lower support 12 with a worktable 16 for supporting a workpiece (not shown), a coupling unit 11 which includes a lower coupler 111 secured to the lower support 12, and an upper coupler 112 adjustably coupled with the lower coupler 111 by means of a screw fastener, an upper support 13 secured to the upper coupler 112, upper and lower blade mounting pulleys 15,14 rotatably mounted on the upper and lower supports 13,12, and an endless band saw blade 17 trained on the pulleys 15,14 and passing through the worktable 16. When a motor (not shown) is actuated, the lower blade mounting pulley 14 is driven to rotate the band saw blade 17 for sawing the workpiece on the worktable 16. Since the rotational speed of the lower blade mounting pulley 14 is fixed, the sawing speed of the band saw blade 17 remains unchanged when sawing workpieces of different thicknesses. Thus, the service life of the band saw blade 17 may be shortened, and the sawing quality of the workpiece may be adversely affected.

SUMMARY OF THE INVENTION

An object of the present invention is to provide a vertical band saw machine with a speed ratio varying device which permits a lower blade mounting pulley to rotate at a desired speed for driving an endless band saw blade.

Another object of the present invention is to provide a vertical band saw machine which permits tension adjustment of an endless band saw blade for achieving good sawing quality.

According to this invention, the vertical band saw machine comprises a machine frame which includes upper and lower supports spaced apart from each other in an upright direction to define a working space therebetween. A worktable is disposed to extend into the working space for placement of a workpiece to be sawn thereon. A motor supplies a drive force. Upper and lower blade mounting pulleys are respectively mounted on and are rotatable relative to the upper and lower supports. An adjusting member is disposed to adjust the upper blade mounting pulley relative to the lower blade mounting pulley in the upright direction. An endless band saw blade is trained on the upper and lower blade mounting pulleys, and has a working segment which extends in the upright direction and which passes through the worktable. A first transmitting shaft is driven by the drive force of the motor to be rotatable about a first axis. A second transmitting shaft is disposed on the lower support, is rotatable about a second axis parallel to the first axis, and is coupled with and rotates the lower blade mounting pulley about the second axis.

A speed ratio varying device is disposed to couple the first transmitting shaft to the second transmitting shaft so as to transmit the drive force of the motor to the second transmitting shaft, thereby driving the second transmitting shaft to rotate the lower blade mounting pulley about the second axis. The speed ratio varying device includes a first pulley, a second pulley, a control unit, a biasing member, and a belt. The first pulley has a first fixed disc mounted securely on the first transmitting shaft, and a first movable disc having a spline connection with the first transmitting shaft so as to be movable relative to the first fixed disc along the first axis. The first fixed and movable discs respectively have first belt-engaging surfaces cooperatively defining therebetween a first belt receiving space. The second pulley has a second fixed disc mounted securely on the second transmitting shaft, and a second movable disc having a spline connection with the second transmitting shaft so as to be movable relative to the second fixed disc along the second axis. The second fixed and movable discs respectively have second belt-engaging surfaces cooperatively defining therebetween a second belt receiving space. The control unit is mounted on the lower support, and has an operable member which is disposed to actuate the second movable disc to move along the second axis so as to be close to or remote from the second fixed disc. The biasing member is disposed to bias the first movable disc toward the first fixed disc. The belt is trained on the first and second pulleys, and is frictionally slidable on the first and second belt-engaging surfaces. The belt has a first lengthwise end which cooperates with the first transmitting shaft to define a first radial distance therebetween, and a second lengthwise end which is opposite to the first lengthwise end and which cooperates with the second transmitting shaft to define a second radial distance therebetween. When actuated by the operable member, the second movable disc is movable along the second axis between first and second positions. In the first position, the second movable disc is remote from the second fixed disc so that the second lengthwise end is near the second transmitting shaft so as to result in a smaller length of the second radial distance. The first movable disc is held close to the first fixed disc by the biasing action of the biasing member, thereby resulting in a greater speed ratio of the second transmitting shaft to the first transmitting shaft so as to rotate the band saw blade at a higher speed. In the second position, the second movable disc is close to the second fixed disc so that the second lengthwise end is remote from the second transmitting shaft so as to result in a greater length of the second radial distance. The first movable disc is kept apart from the first fixed disc by a tension force which is generated as a result of displacement of the first lengthwise end toward the first transmitting shaft and which acts against the biasing action of the biasing member, thereby resulting in a smaller speed ratio of the second transmitting shaft to the first transmitting shaft so as to rotate the band saw blade at a lower speed.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 2:
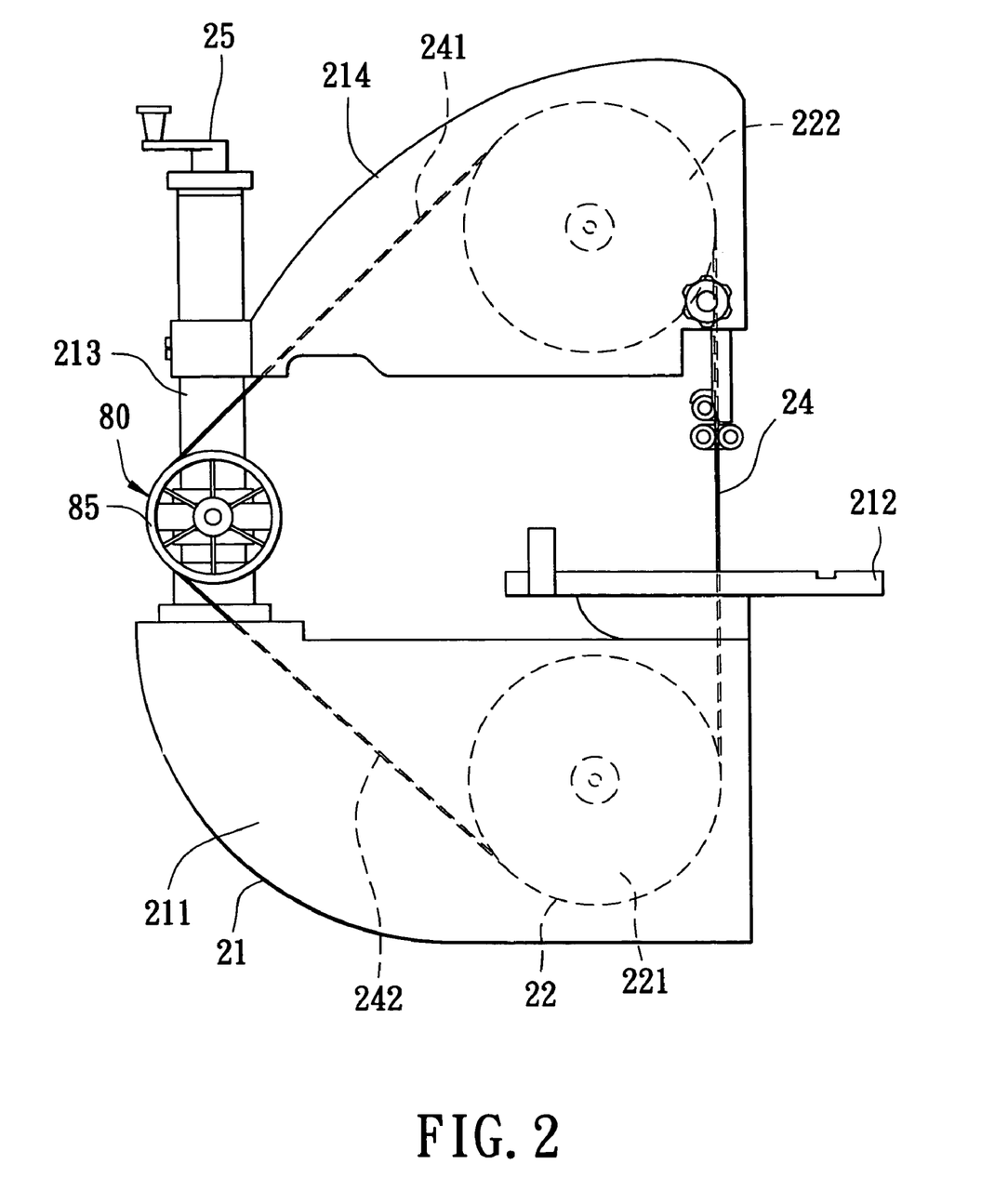
FIGS. 2 and 3 are schematic side views of the preferred embodiment of a vertical band saw machine according to this invention.
Figure 3:
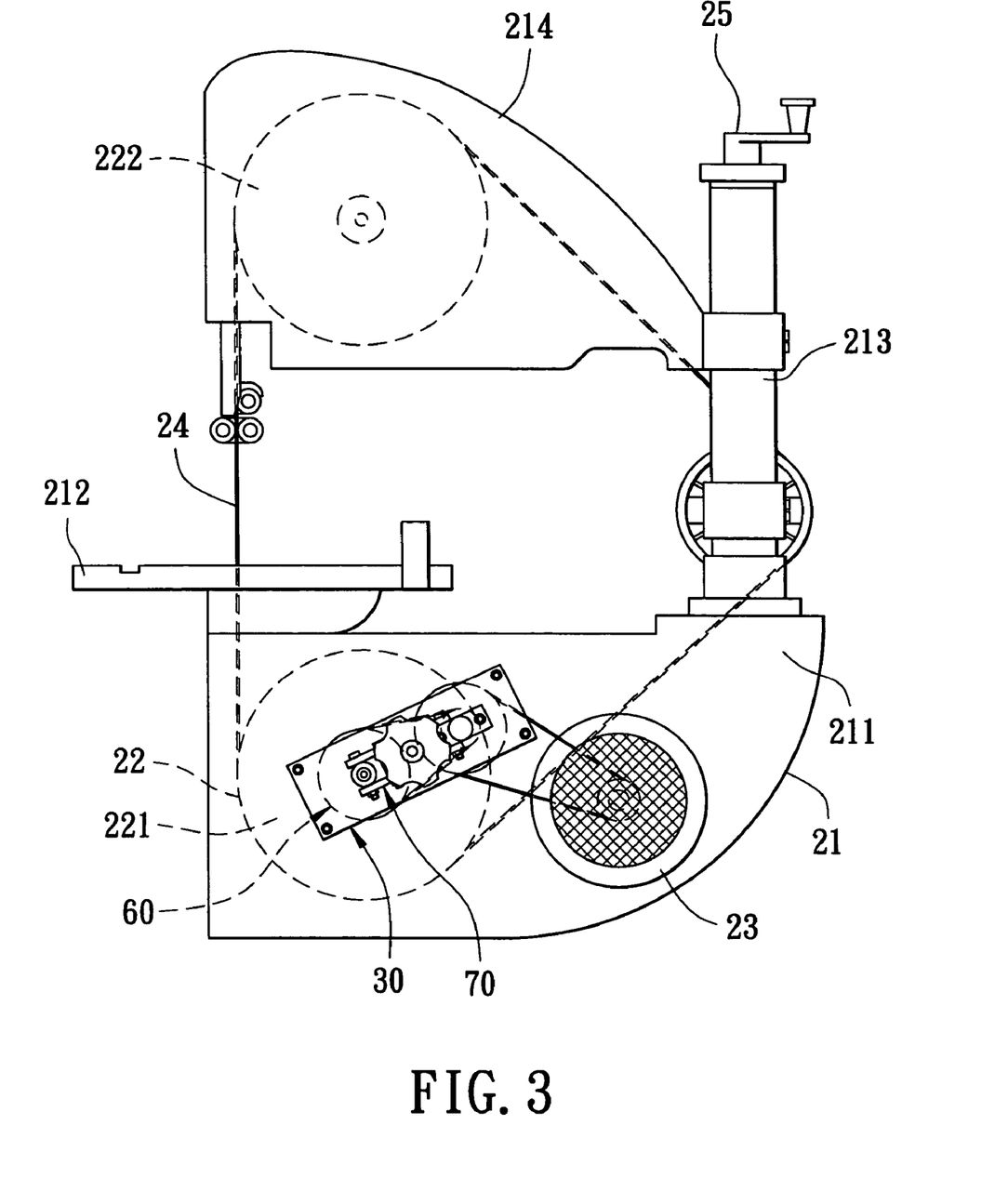
Figure 4:
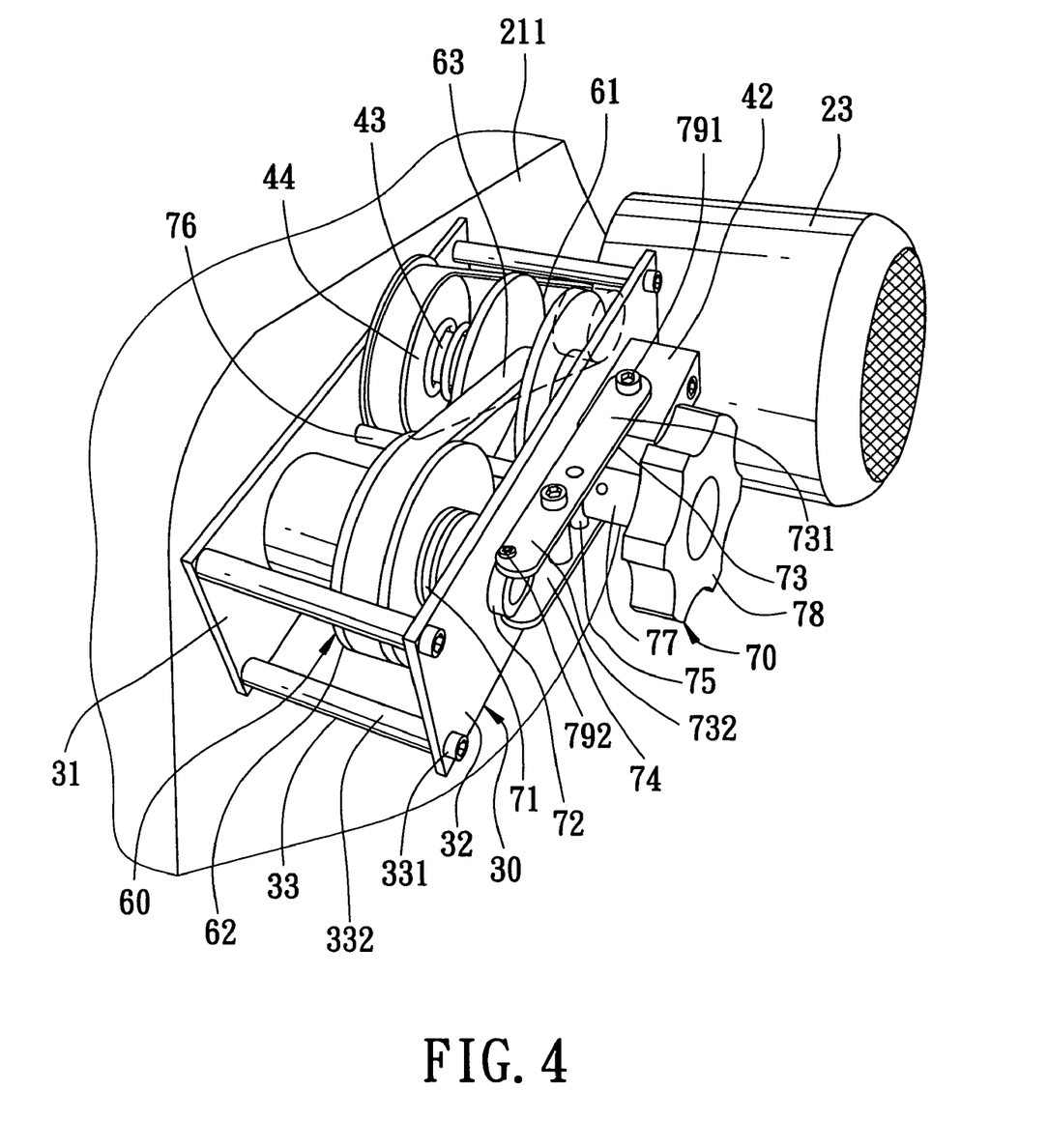
FIG. 4 is a fragmentary perspective view of a speed ratio varying device of the preferred embodiment.

Referring to FIGS. 2 to 4, the preferred embodiment of a vertical band saw machine according to the present invention is shown to comprise a machine frame 21, a sawing unit 22, a motor 23, a drive transmission mechanism, and a fine adjustment device 80.

The machine frame 21 includes a lower support 211, an upright post 213 which extends from the lower support 211 in an upright direction, an upper support 214 which is mounted on the upright post 213, which is slidably retained along the upright post 213 by means of an adjusting member 25, and which is spaced apart from the lower support 211 in the upright direction to define a working space therebetween. A worktable 212 is disposed on the lower support 211 and extends into the working space for placement of a workpiece (not shown) to be sawn thereon.

The sawing unit 22 includes upper and lower blade mounting pulleys 222,221 which are mounted on and which are rotatable relative to the upper and lower supports 214, 211, respectively, and an endless band saw blade 24 trained on the upper and lower blade mounting pulleys 222,221. The band saw blade 24 has a working segment which extends in the upright direction and which passes through the worktable 212. The upper blade mounting pulley 222 is movable relative to the lower blade mounting pulley 221 in the upright direction so as to adjust the distance therebetween for facilitating replacement of the band saw blade 24.

The motor 23 is disposed on the lower support 211 for supplying a drive force.

With reference to FIGS. 3 to 6, the drive transmission mechanism includes a support unit 30, a first transmission unit 40, a second transmission unit 50, and a speed ratio varying device 60.

The support unit 30 includes first and second support plates 31,32 mounted on the lower support 211 and spaced apart from each other, and a plurality of spacers 33 interposed between the first and second support plates 31,32. Each spacer 33 includes a screw bolt 331 passing through the first and second support plates 31,32 and secured to the lower support 211, and a sleeve 332 sleeved on the screw bolt 331 and disposed between the first and second support plates 31,32.

The first transmission unit 40 includes two bearing members 41,42 respectively mounted on the first and second support plates 31,32 for rotatably mounting a first transmitting shaft 43 about a first axis. A transmitting wheel 44 is mounted on the first transmitting shaft 43, and is coupled to the motor 23 so as to be driven by the drive force of the motor 23 to rotate the first transmitting shaft 43 disposed about a first axis.

The second transmission unit 50 includes a bearing member 51 mounted on the first support plate 31 for rotatably mounting a second transmitting shaft 52 about a second axis parallel to the first axis. The second transmitting shaft 52 includes a first shaft end 521 extending laterally of the lower support 211 to journal the lower blade mounting pulley 221 so as to rotate the same about the second axis, and a second shaft end 522 disposed between the first and second support plates 31,32.

The speed ratio varying device 60 is disposed to couple the first transmitting shaft 43 to the second shaft end 522 of the second transmitting shaft 52 so as to transmit the drive force of the motor 23 to the second transmitting shaft 52, thereby driving the first shaft end 521 of the second transmitting shaft 52 to rotate the lower blade mounting pulley 221 about the second axis. Specifically, the speed ratio varying device 60 includes a first pulley 61, a biasing member 613, a second pulley 62, a belt 63, and a control unit 70.

The first pulley 61 has a first fixed disc 611 which is mounted securely on the first transmitting shaft 43, and a first movable disc 612 which has a spline connection with the first transmitting shaft 43 so as to be movable relative to the first fixed disc 611 along the first axis. The first fixed and movable discs 611,612 respectively have first belt-engaging surfaces which cooperatively define therebetween a first belt receiving space. The biasing member 613 is disposed between the first movable disc 612 and the transmitting wheel 44 to bias the first movable disc 612 toward the first fixed disc 611.

The second pulley 62 has a second fixed disc 621 which is mounted securely on the second shaft end 522 of the second transmitting shaft 52, and a second movable disc 622 which has a spline connection with the second shaft end 522 of the second transmitting shaft 52 so as to be movable relative to the second fixed disc 621 along the second axis. The second fixed and movable discs 621,622 respectively have second belt-engaging surfaces which cooperatively define therebetween a second belt receiving space.

The belt 63 is trained on the first and second pulleys 61,62, and is frictionally slidable on the first and second belt-engaging surfaces. The belt 63 has a first lengthwise end which cooperates with the first transmitting shaft 43 to define a first radial distance therebetween, and a second lengthwise end which is opposite to the first lengthwise end and which cooperates with the second transmitting shaft 52 to define a second radial distance therebetween.

The control unit 70 includes a bearing member 71 which is sleeved on a sleeve portion 623 that extends from the second movable disc 622, and which has a securing race that is rotated with the second movable disc 622, and a pushed race that is opposite to the securing race along the second axis.

A pushing member 72 is inserted into the second support plate 32, is sleeved on the sleeve portion 623 to be movable along the second axis, and has a pushing end to urge or to relieve the pushed race of the bearing member 71 so as to move the second movable disc 622, and a coupled end opposite to the pushing end along the second axis.

A pair of actuating members 73,74 are disposed between the bearing member 42 and the pushing member 72, and are spaced apart from each other. Each actuating member 73,74 is in the form of a lever, and has a fulcrum end 731,741 pivotally mounted to the bearing member 42 on the support unit 30 on the lower support 211 about a pivot axis transverse to the second axis by means of a pivot pin 791, and a weight end 732,742 which are opposite to the fulcrum end 731,741 and which are connected to each other by means of an insert pin 792 that is connected to the coupled end of the pushing member 72 such that when the weight ends 732,742 are turned about the pivot axis clockwise or counterclockwise, the coupled end of the pushing member 72 will be moved so as to urge the second movable disc 622 along the second axis. Each actuating member 73,74 further has a middle force portion 733,743 interposed between the fulcrum end 731,741 and the weight end 732,742. A force post 75 is disposed between the middle force portions 733,743.

An operable member includes a threaded bolt 76 having a connecting segment 761 rotatably mounted on the first support plate 31, a threaded segment 763 which threadedly engages a screw hole 321 in the second support plate 32, a pushing segment 762 which is disposed opposite to the threaded segment 763 relative to the force post 75 and which has a pushing sleeve 77 secured thereon, and a terminal end provided with a rotary knob 78.

Figure 6:
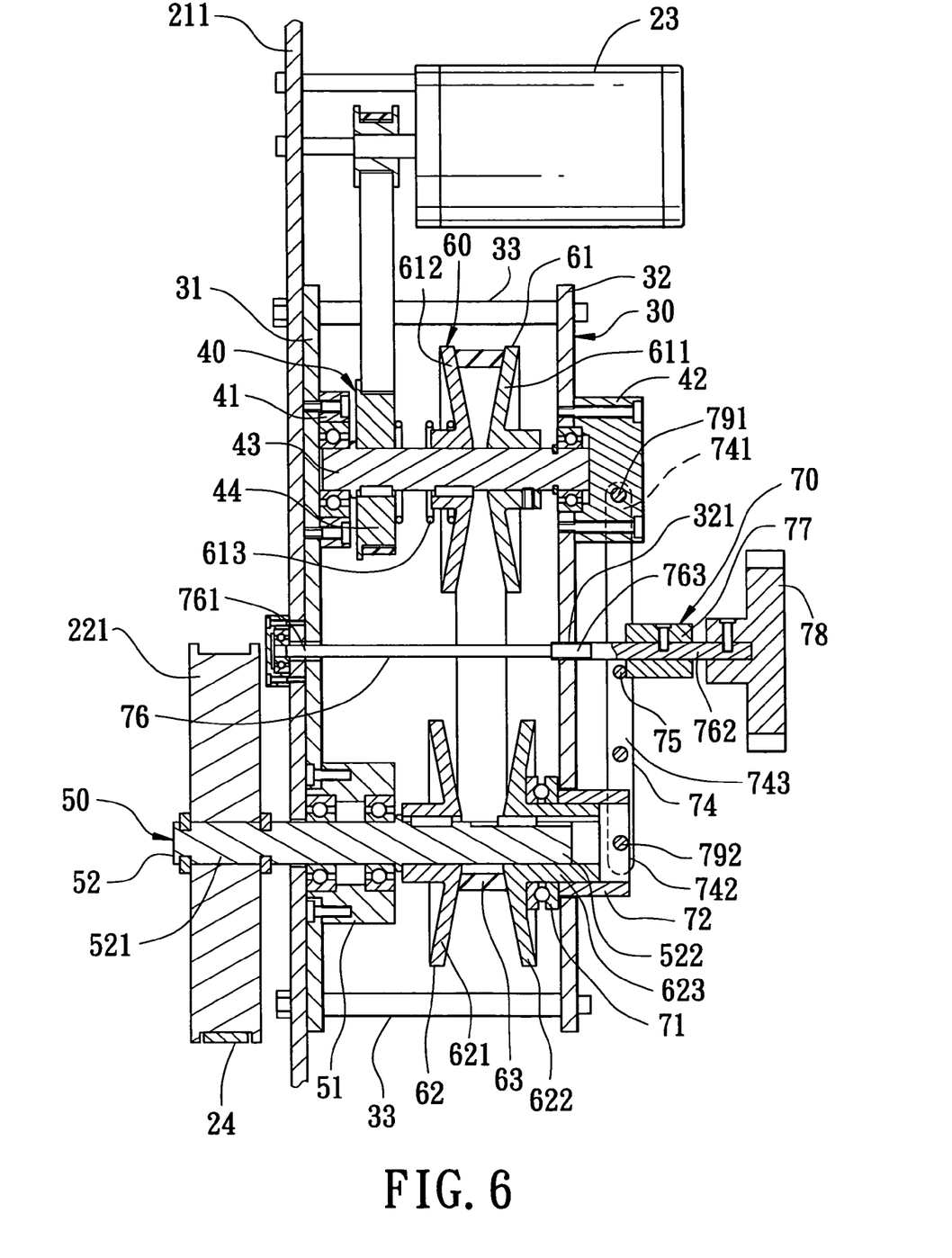
FIG. 6 is a partly sectional view of the preferred embodiment in a state where the control unit is not operated.

Referring to FIGS. 3 and 6, when the motor 23 is actuated to rotate the first transmitting shaft 43 by means of the transmitting wheel 44, the second transmitting shaft 52 is rotated by means of the speed ratio varying device 60 such that the lower blade mounting pulley 221 is rotated to drive the upper blade mounting pulley 222 and the band saw blade 24 to perform a sawing operation.

Figure 5:
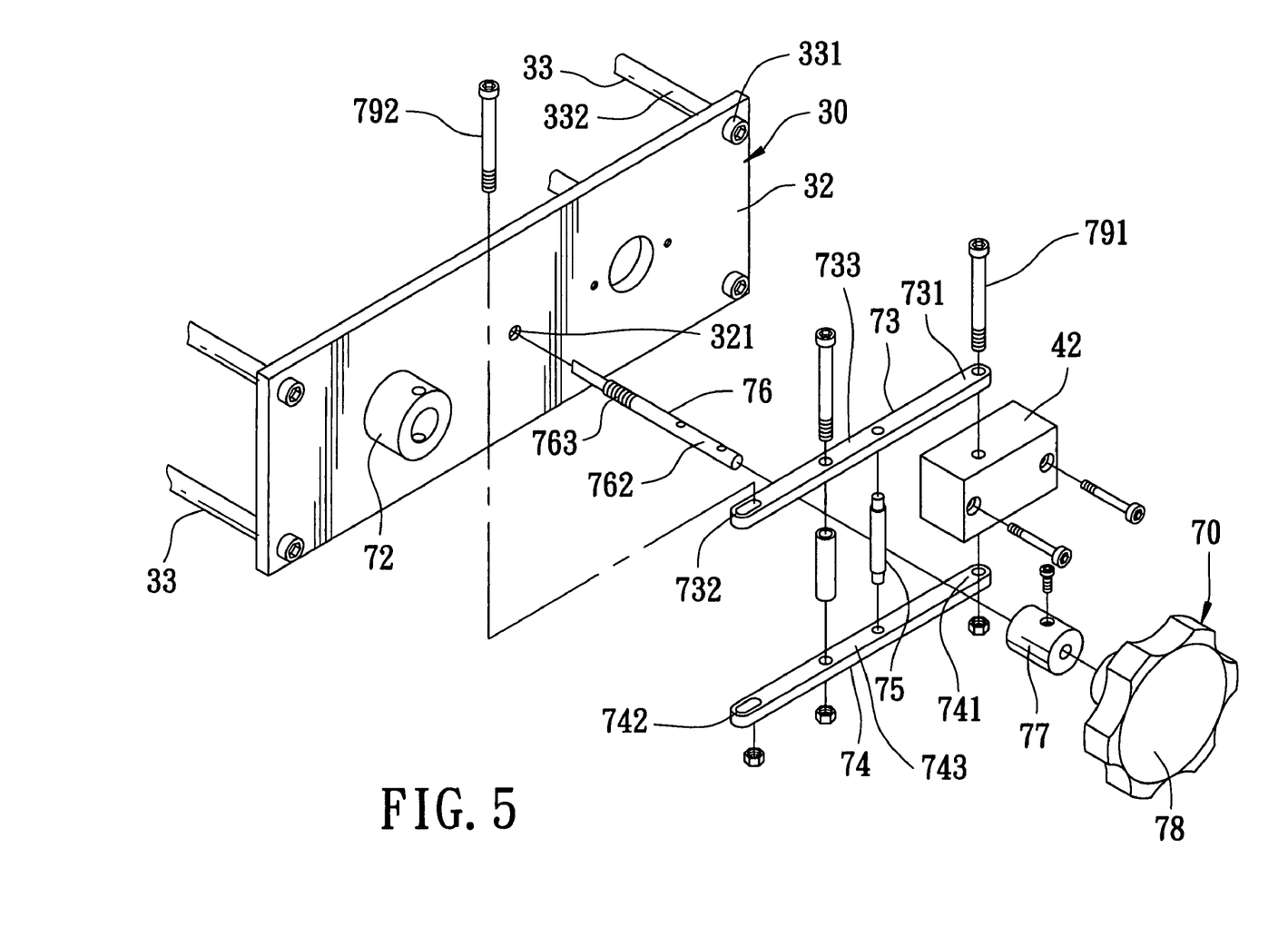
FIG. 5 is an exploded perspective view of a control unit of the preferred embodiment.
Figure 7:
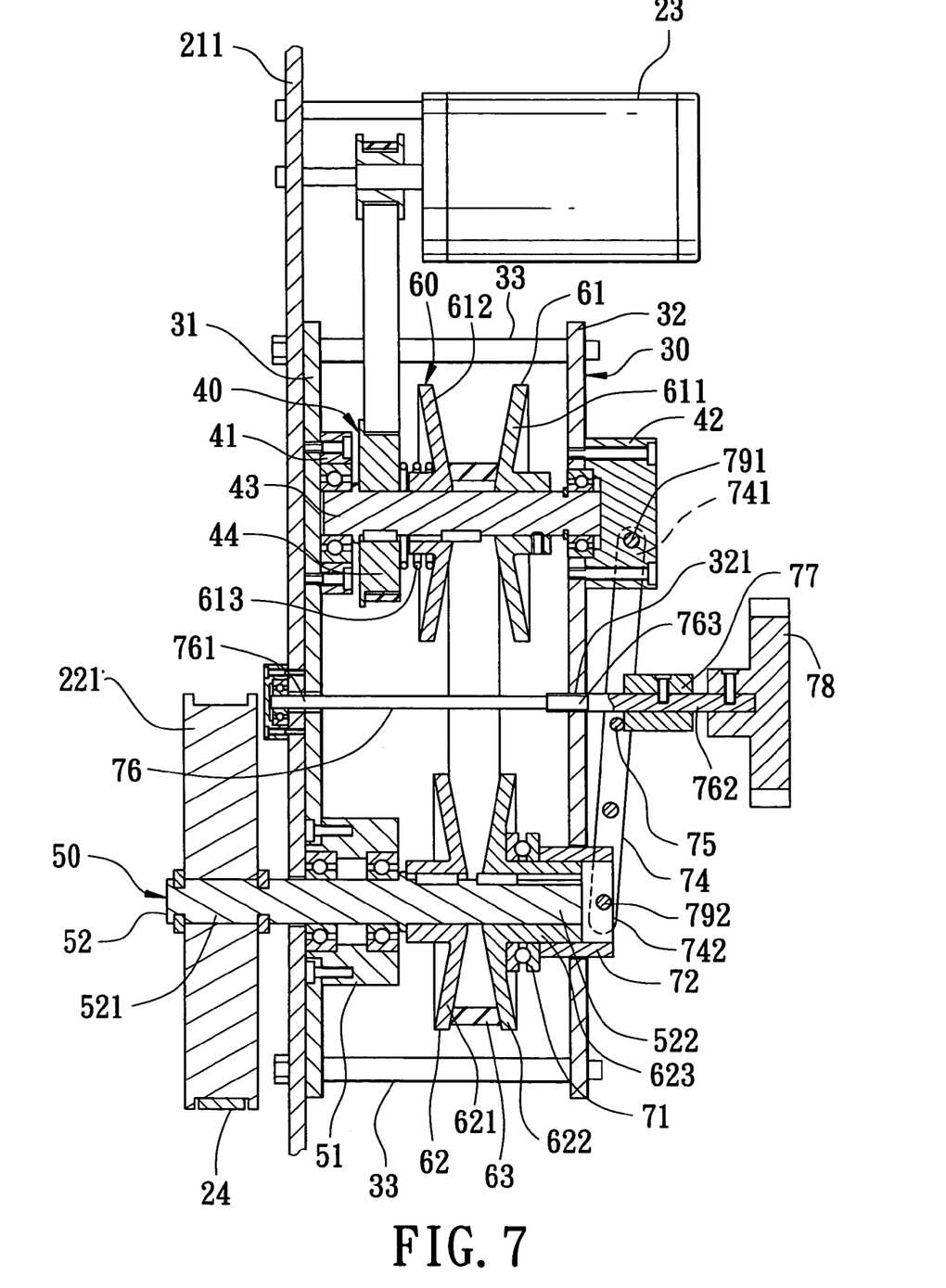
FIG. 7 is a view similar to FIG. 6 but showing the preferred embodiment in a state where the control unit is operated to press a movable disc.

Referring to FIGS. 5, 6 and 7, when it is desired to change the rotational speed of the band saw blade 24, the rotary knob 78 is rotated to bring the threaded bolt 76 into a threaded movement so as to permit the pushing sleeve 77 to press against the force post 75, thereby turning the weight ends 732,742 and the insert pin 792 about the pivot axis of the pivot pin 791. Thus, the pushing end of the pushing member 72 is brought to urge the pushed race of the bearing member 71 so as to place the second movable disc 622 from a first position where the second movable disc 622 is remote from the second fixed disc (see FIG. 6) to a second position, where the second movable disc 622 is close to the second fixed disc (FIG. 7).

In the first position, as shown in FIG. 6, the second lengthwise end is near the second transmitting shaft 52 so as to result in a smaller length of the second radial distance. The first movable disc 612 is held close to the first fixed disc 611 by the biasing action of the biasing member 613, thereby resulting in a greater speed ratio of the second transmitting shaft 52 to the first transmitting shaft 43 so as to rotate the band saw blade 24 at a higher speed.

In the second position, as shown in FIG. 7, the second lengthwise end is remote from the second transmitting shaft 52 so as to result in a greater length of the second radial distance. The first movable disc 612 is kept apart from the first fixed disc 611 by a tension force which is generated as a result of displacement of the first lengthwise end toward the first transmitting shaft 43 and which acts against the biasing action of the biasing member 613, thereby resulting in a smaller speed ratio of the second transmitting shaft 52 to the first transmitting shaft 43 so as to rotate the band saw blade 24 at a lower speed.

With a construction as such, the operator only needs to turn the rotary knob 78 through a predetermined angle to vary the speed ratio of the second transmitting shaft 52 to the first transmitting shaft 43 so as to change freely the rotational speed of the second transmitting shaft 52 as well as the sawing speed of the band saw blade 24 to suit workpieces of different thicknesses, thereby prolonging the service life of the band saw blade 24, and maintaining good sawing quality.

Figure 8:
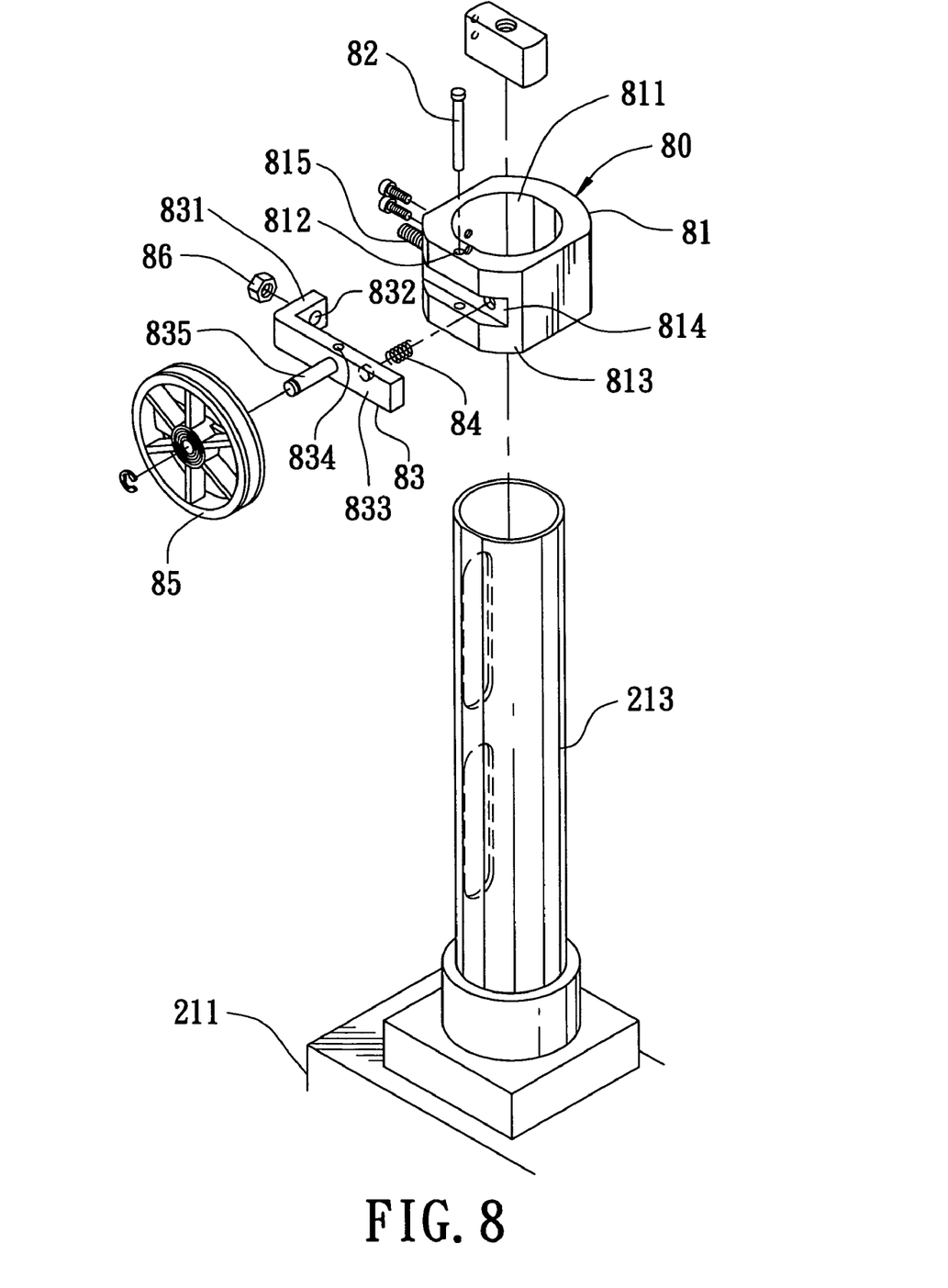
FIG. 8 is an exploded perspective view of a fine adjustment device of the preferred embodiment.
Figure 9:
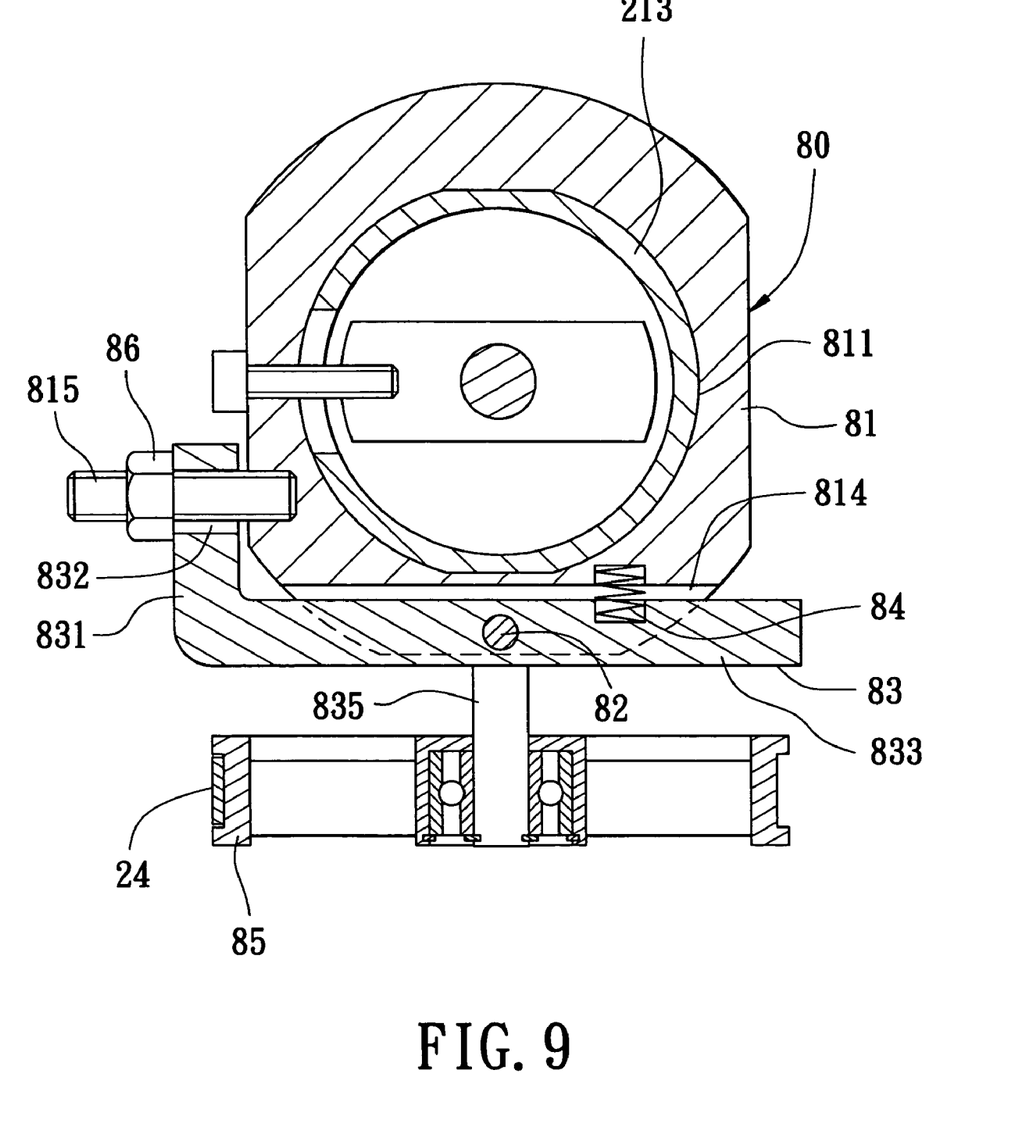
FIGS. 9 and 10 are sectional views showing the fine adjustment device of the preferred embodiment in two different positions.

Referring to FIGS. 2, 8 and 9, the fine adjustment device 80 includes a coupling member 81, an L-shaped actuating lever 83, and a tension-equalizing guider pulley 85. The coupling member 81 has an inner surface 811 which has a spline connection with the upright post 213, i.e. slidable along but non-rotatable relative to the upright post 213, and an outer surface 813 which is formed with a slot 814 and a screw bolt 815.

The L-shaped actuating lever 83 has a retained end 831 which is formed with a hole 832 to engage the screw bolt 815 and a screw nut 86 so as to be loosenably retained to the coupling member 81, an urged end 833 which is opposite to the retained end 831 and which can be received in the slot 814, and a middle portion which is interposed between the retained and urged ends 831,833 and which is pivotally mounted on the coupling member 81 by means of a pivot pin 82 that extends along a pivot axis in the upright direction and that engages a pivot hole 834 in the middle portion of the actuating lever 83 and two pivot holes 812 in the coupling member 81. An axle shaft 835 is mounted on and extends from the middle portion of the actuating lever 83 along a pulley axis parallel to the second axis of the second transmitting shaft 52. A biasing unit 84, such as a compression spring, is disposed to bias the urged end 833 to turn about the pivot axis away from the slot 814.

The tension-equalizing guider pulley 85 is rotatably mounted on the axle shaft 835 about the pulley axis, and is trained by the band saw blade 24 so as to define, in respective cooperation with the upper and lower blade mounting pulleys 222,221, upper and lower inclined side paths 241,242. Furthermore, the tension-equalizing guider pulley 85 is disposed to be brought into synchronized movement with the upper support 214 by means of the adjusting member 25 so as to keep unchanged the ratio of lengths between the upper and lower inclined side paths 241,242.

Figure 10:
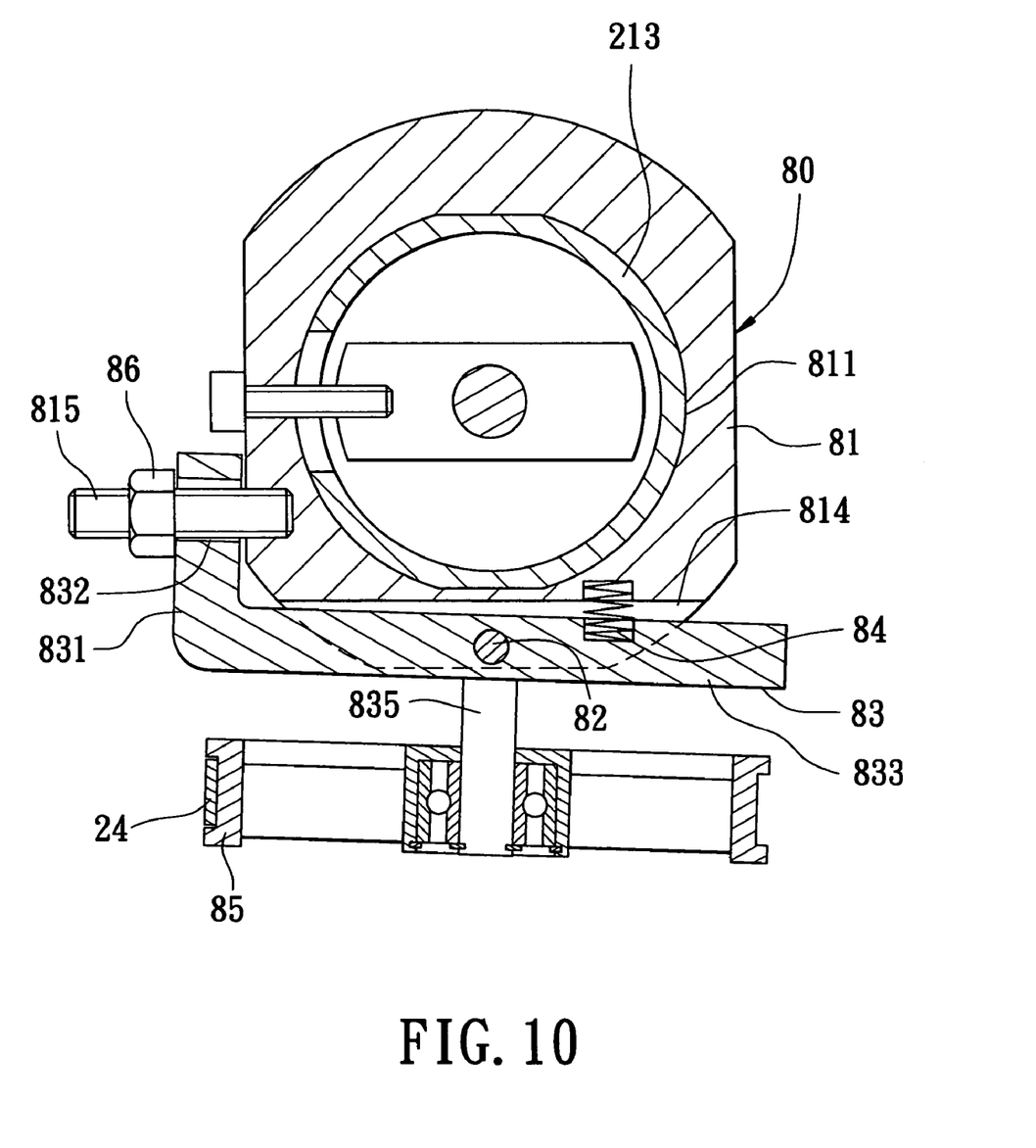

Referring to FIGS. 2, 9 and 10, when it is desired to perform a finer adjustment of the tension of the band saw blade 24, the screw nut 86 is screwed outwardly to loosen the retained end 831 of the actuating lever 83. The urged end 833 is turned by biasing action of the biasing unit 84 so as to tilt the axle shaft 835 about the pivot axis of the pivot pin 82, thereby enabling the finer adjustment of the tension of the band saw blade 24 while keeping the lengths of the upper and lower inclined side paths 241,242 equal to each other. Thus, an appropriate tension force of the band saw blade 24 can be achieved so as to ensure good sawing quality.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:
1. A vertical band saw machine comprising:
  a machine frame including upper and lower supports spaced apart from each other in an upright direction to define a working space therebetween;
  a worktable disposed to extend into said working space for placement of a workpiece to be sawn thereon;
  a motor for supplying a drive force;
  upper and lower blade mounting pulleys respectively mounted on and rotatable relative to said upper and lower supports;

an adjusting member disposed to adjust said upper blade mounting pulley relative to said lower blade mounting pulley in the upright direction;

an endless band saw blade trained on said upper and lower blade mounting pulleys, and having a working segment which extends in the upright direction and which passes through said worktable;

a first transmitting shaft driven by the drive force of said motor to be rotatable about a first axis;

a second transmitting shaft disposed on said lower support, rotatable about a second axis parallel to the first axis, and coupled to and rotating said lower blade mounting pulley about the second axis; and a speed ratio varying device disposed to couple said first transmitting shaft to said second transmitting shaft so as to transmit the drive force of said motor to said second transmitting shaft, thereby driving said second transmitting shaft to rotate said lower blade mounting pulley about the second axis, said speed ratio varying device including a first pulley having a first fixed disc which is mounted securely on said first transmitting shaft, and a first movable disc which has a spline connection with said first transmitting shaft so as to be movable relative to said first fixed disc along the first axis, said first fixed and movable discs respectively having first belt-engaging surfaces which cooperatively define therebetween a first belt receiving space, a second pulley having a second fixed disc which is mounted securely on said second transmitting shaft, and a second movable disc which has a spline connection with said second transmitting shaft so as to be movable relative to said second fixed disc along the second axis, said second fixed and movable discs respectively having second belt-engaging surfaces which cooperatively define therebetween a second belt receiving space, a control unit mounted on said lower support, and having an operable member which is disposed to actuate said second movable disc to move along the second axis so as to be close to or remote from said second fixed disc, a biasing member disposed to bias said first movable disc toward said first fixed disc, and a belt trained on said first and second pulleys, and frictionally slidable on said first and second belt-engaging surfaces, said belt having a first lengthwise end which cooperates with said first transmitting shaft to define a first radial distance therebetween, and a second lengthwise end which is opposite to said first lengthwise end and which cooperates with said second transmitting shaft to define a second radial distance therebetween such that, when said second movable disc is actuated by said operable member, said second movable disc is movable along the second axis between a first position, where said second movable disc is remote from said second fixed disc so that said second lengthwise end is near said second transmitting shaft so as to result in a smaller length of the second radial distance, and where said first movable disc is held close to said first fixed disc by the biasing action of said biasing member, thereby resulting in a greater speed ratio of said second transmitting shaft to said first transmitting shaft so as to rotate said band saw blade at a higher speed, and a second position, where said second movable disc is close to said second fixed disc so that said second lengthwise end is remote from said second transmitting shaft so as to result in a greater length of the second radial distance, and where said first movable disc is kept apart from said first fixed disc by a tension force which is generated as a result of displacement of said first lengthwise end toward said first transmitting shaft and which acts against the biasing action of said biasing member, thereby resulting in a smaller speed ratio of said second transmitting shaft to said first transmitting shaft so as to rotate said band saw blade at a lower speed.

2. The vertical band saw machine of claim 1, wherein said control unit includes a pushing member disposed to be movable along the second axis, and having a pushing end to urge or to relieve said second movable disc so as to place said second movable disc in the first position or the second position, respectively, and a coupled end opposite to said pushing end along the second axis, and a pair of actuating members, each of which has a fulcrum end pivotally mounted to said lower support about a pivot axis transverse to the second axis, and a weight end opposite to said fulcrum end and coupled to said coupled end of said pushing member such that when said weight end is turned about the pivot axis clockwise or counterclockwise, said coupled end of said pushing member will be moved so as to place said second movable disc in the first position or the second position, each of said actuating members further having a middle force portion interposed between said fulcrum and weight ends;

said operable member including a threaded bolt having a threaded segment which threadedly engages said lower support, and a pushing segment which is disposed opposite to said threaded segment relative to said middle force portion such that threaded movement of said threaded segment will bring said pushing segment to press against said middle force portion to turn said weight end about the pivot axis.

3. The vertical band saw machine of claim 2, wherein said control unit further includes a bearing member having a securing race which is rotated with said second movable disc, and a pushed race which is opposite to said securing race along the second axis, said pushing end of said pushing member being disposed to urge or to relieve said pushed race to place said second movable disc in the first position or the second position.

4. The vertical band saw machine of claim 1, wherein said machine frame further includes an upright post extending from said lower support in the upright direction, said upper support being slidably retained relative to said upright post in the upright direction so as to adjust said upper blade mounting pulley relative to said lower blade mounting pulley in the upright direction, said vertical band saw machine further comprising a tension-equalizing guider pulley which is mounted on and which is rotatable relative to said upright post, and which is trained by said endless band saw blade so as to define, in respective cooperation with said upper and lower blade mounting pulleys, upper and lower inclined side paths, said tension-equalizing guider pulley being further disposed to be movably retained relative to said upright post in the upright direction, and being brought into synchronized movement with said upper support so as to keep unchanged the ratio of lengths between the upper and lower inclined side paths.

5. The vertical band saw machine of claim 4, further comprising:

a coupling member disposed to be slidably retained relative to said upright post in the upright direction;

an actuating lever having a retained end which is loosenably retained to said coupling member, an urged end which is opposite to said retained end, and a middle portion which is interposed between said retained and urged ends and which is pivotally mounted on said coupling member about a pivot axis in the upright direction;

an axle shaft which is mounted on and which extends from said middle portion so as to journal said tensionequalizing guider pulley thereon along a pulley axis that is transverse to the pivot axis; and a biasing unit disposed to bias said urged end to turn about the pivot axis away from said coupling member such that, when said retained end is loosened, said urged end is turned by biasing action of said biasing unit so as to tilt said axle shaft about the pivot axis to enable a finer adjustment of the tension of said endless band saw blade while keeping the lengths of the upper and lower inclined side paths equal to each other.

* * * * *